(12) United States Patent
An et al.

(10) Patent No.: US 10,696,262 B2
(45) Date of Patent: Jun. 30, 2020

(54) SAFETY AIRBAG HOUSING AND SAFETY AIRBAG ASSEMBLY

(71) Applicant: AUTOLIV DEVELOPMENT AB, Vårgårda (SE)

(72) Inventors: Xiaochao An, Shanghai (CN); Peng Yuan, Shanghai (CN); Binbin Peng, Shanghai (CN)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/772,185

(22) PCT Filed: Nov. 7, 2016

(86) PCT No.: PCT/CN2016/104853
§ 371 (c)(1),
(2) Date: Apr. 30, 2018

(87) PCT Pub. No.: WO2017/092546
PCT Pub. Date: Jun. 8, 2017

(65) Prior Publication Data
US 2018/0312129 A1    Nov. 1, 2018

(30) Foreign Application Priority Data
Dec. 3, 2015 (CN) .................... 2015 2 0996800 U

(51) Int. Cl.
*B60R 21/217* (2011.01)
*B60R 21/20* (2011.01)
(Continued)

(52) U.S. Cl.
CPC ............ *B60R 21/217* (2013.01); *B60R 21/20* (2013.01); *B60R 21/205* (2013.01); *B60R 21/264* (2013.01)

(58) Field of Classification Search
CPC ........................... B60R 21/205; B60R 21/217
See application file for complete search history.

(56) References Cited

U.S. PATENT DOCUMENTS 6,109,645 A * 8/2000 Totani ................. B29C 37/0057
280/728.3
6,152,479 A * 11/2000 Wagener ............. B60R 21/2171
280/728.2
(Continued)

FOREIGN PATENT DOCUMENTS

CN    101973240 A    2/2011
CN    203438974 U    2/2014
(Continued)

OTHER PUBLICATIONS

International Search Report for PCT/CN2016/104853, ISA/CN, Haidian District, Beijing, with English translation, dated Feb. 9, 2017.

(Continued)

*Primary Examiner* — James A English
(74) *Attorney, Agent, or Firm* — Stephen T. Olson; Harness, Dickey & Pierce, P.L.C.

(57) ABSTRACT

The present disclosure relates to an airbag housing and an airbag assembly. There is provided an airbag assembly comprising: a bottom wall; and a side wall for forming a cavity accommodating an airbag cushion together with the bottom wall, wherein at least a portion of the side wall is formed in a double layer structure. There is also provided an airbag assembly having the airbag housing.

9 Claims, 3 Drawing Sheets

(51) Int. Cl.
*B60R 21/205* (2011.01)
*B60R 21/264* (2006.01)

(56) References Cited

U.S. PATENT DOCUMENTS

| | | | | |
|---|---|---|---|---|
| 6,824,163 B2* | 11/2004 | Sen | ................... | B60R 21/217 |
| | | | | 280/728.2 |
| 2002/0067028 A1* | 6/2002 | Ostermann | ......... | B60R 21/2171 |
| | | | | 280/728.2 |
| 2007/0284863 A1* | 12/2007 | Bostick | ................ | B60R 21/217 |
| | | | | 280/741 |
| 2010/0117337 A1* | 5/2010 | Yamauchi | ............. | B60R 21/217 |
| | | | | 280/728.2 |
| 2012/0007346 A1* | 1/2012 | Morawietz | ........... | B60R 21/205 |
| | | | | 280/728.2 |
| 2013/0113191 A1* | 5/2013 | Schneider | ............. | B60R 21/215 |
| | | | | 280/728.3 |
| 2013/0277950 A1* | 10/2013 | Yamami | ................. | B60R 21/20 |
| | | | | 280/728.2 |
| 2015/0108740 A1* | 4/2015 | Nebel | ................... | B60R 21/217 |
| | | | | 280/728.2 |
| 2017/0057445 A1* | 3/2017 | Byers | ................... | B60R 21/205 |

FOREIGN PATENT DOCUMENTS

| | | |
|---|---|---|
| CN | 104015684 A | 9/2014 |
| CN | 205381231 U | 7/2016 |
| JP | 2008-013075 A | 1/2008 |
| KR | 20040074517 A | 8/2004 |

OTHER PUBLICATIONS

Written Opinion of the ISA for PCT/CN2016/104853, Haidian District, Beijing, dated Feb. 9, 2018 (in Chinese).

\* cited by examiner

SAFETY AIRBAG HOUSING AND SAFETY AIRBAG ASSEMBLY

CROSS-REFERENCE TO RELATED APPLICATIONS

This application is a 371 U.S. National Stage of International Application No. PCT/2016/104853, filed Nov. 7, 2016, which claims the benefit of Chinese Patent Application No. 201520996800.3, filed Dec. 3, 2015. The disclosures of the above applications are incorporated herein by reference.

TECHNICAL FIELD

The present disclosure relates to an airbag for vehicle, and more particularly, to an airbag housing and an airbag assembly having the same.

BACKGROUND

Most of existing vehicles have airbags. Taking a front passenger airbag as an example, an airbag housing can be made of metal or plastic. The metal housing can be made by welding of steel plate or pressing forming of metal. The metal housing has good strength and ductility, and is deformable and good at energy absorption. However, the metal housing has heavy weight. The plastic housing is usually formed by injection molding, and thus has simple manufacturing process and prevents failure from additional connection structure. However, the plastic housing has poor strength and deformability, and requires thicken walls and reinforcing ribs to improve its strength.

Between the two housings for airbag, the metal housing has a weight of about 500 g, while the plastic housing has a weight of about 400 g. Each of the two housings has a high material cost and a large weight. In motor vehicle industry, it is an increasingly urgent problem to reduce material cost and weight for components of motor vehicles.

SUMMARY

The disclosure provides a novel concept for airbag housing, which can improve the structure of the airbag housing. Furthermore, a molded airbag housing can reduce defects in ejection phase and improve machinability. Another object of the disclosure is to provide an airbag assembly comprising the above airbag housing.

There is provided an airbag assembly comprising: a bottom wall; and a side wall for forming a cavity accommodating an airbag cushion together with the bottom wall, wherein at least a portion of the side wall is formed in a double layer structure.

The side wall with the double layer structure is formed by holes in the side wall. Each layer of the double layer structure of the side wall has a thickness smaller than the side wall in a single layer structure, thus the structure of the airbag housing is optimized. Moreover, the airbag housing is molded, thus it is possible to reduce defects in ejection phase and improve machinability.

Preferably, at least a portion of the airbag assembly is provided with an opening.

The opening in the airbag housing can meet the strength requirement and also reduce the weight of the airbag housing.

Preferably, the opening comprises a first opening which extends from the bottom wall to at least a portion of the side wall that is connected with the bottom wall.

Preferably, an orifice is formed in the bottom wall for aligning with a gas inlet of the airbag cushion, wherein the airbag cushion is crimped at an outside area of the orifice and the bottom wall has a joining area at which the airbag cushion is crimped with the bottom wall, and wherein the first opening extends from a periphery of the joining area to at least a portion of the side wall along a longitudinal direction of the airbag housing.

Preferably, the opening comprises a second opening which extends from the orifice to at least a portion of the side wall along a lateral direction of the airbag housing.

Preferably, the airbag housing further comprises a reinforcement that extends from the bottom wall to the side wall.

Preferably, a connecting length of the bottom wall and the side wall at a second-opening side of the bottom wall is larger than a connecting length of the bottom wall and the side wall at a side of the bottom wall opposite to the second-opening side.

Preferably, a height of the side wall at a second-opening side is smaller than a height of the side wall at a side of the side wall opposite to the second-opening side.

There is also provided an airbag assembly comprising: a gas generator; an airbag cushion; a clamp ring; an airbag housing comprising: a bottom wall; and a side wall for forming a cavity accommodating an airbag cushion together with the bottom wall, wherein at least a portion of the side wall is formed in a double layer structure, wherein the airbag cushion is crimped into the cavity of the airbag housing by the clamp ring, and wherein a gas inlet of the airbag cushion aligns with an orifice in the bottom wall, the gas generator is outside of the cavity, and the airbag cushion, the clamp ring, the airbag housing and the gas generator are fixed together such that the gas generator is able to fill the airbag cushion with gas.

BRIEF DESCRIPTION OF THE DRAWINGS

Features, advantages and technical significance of exemplary embodiments of the disclosure will be described below with reference to the accompanying drawings, in which like numerals denote like elements, and wherein.

DETAILED DESCRIPTION

Exemplary embodiments will be described below in detail with reference to the drawings. It should be noted that the following description and drawings are merely provided for describing principles of the present invention. The present invention is not limited to the described preferred embodiments. The scope of the invention is defined by the accompanying claims.

Figure 1:
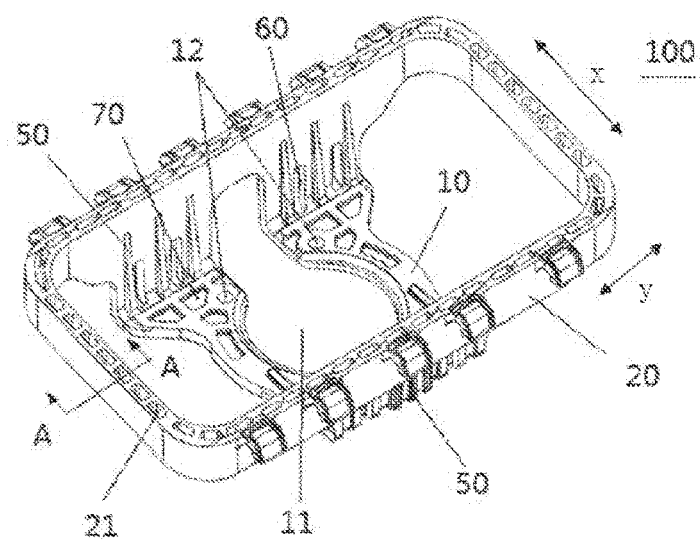
FIG. 1 is a perspective view of an airbag housing according to an embodiment of the present disclosure.

FIG. 1 is a perspective view of an airbag housing according to an embodiment of the present disclosure. As shown in FIG. 1, the airbag housing 100 comprises a bottom wall 10 and a side wall 20. The bottom wall 10 and the side wall 20 form a cavity for accommodating an airbag cushion. There are formed in the bottom wall 10 an orifice 11 for aligning with a gas inlet of the airbag cushion and four fixing holes 12 (two of which are not shown in FIG. 1) for connecting with other components such as airbag cushion, gas generator and the like.

The side wall 20 of the airbag housing 100 has a double layer structure which is formed by holes 21 in the side wall 20. Each layer of the double layer structure of the side wall 20 has a thickness smaller than the side wall 20 in a single layer structure, thus the structure of the airbag housing 100 is optimized. Moreover, the airbag housing 100 is molded, thus it is possible to reduce defects in ejection phase and improve machinability.

According to an embodiment of the disclosure, the hole 21 formed in the double layer structure of the side wall 20 is a through hole, which is formed completely through the side wall 20 in its height direction.

Alternatively, the hole 21 formed in the double layer structure of the side wall 20 can be a blind hole, which extends in the side wall 20 without passing through the side wall 20 in its height direction. This can facilitate the mould ejection and improve the machinability of the side wall 20.

Figure 2:
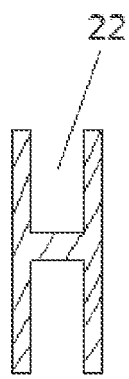
FIG. 2 is a cross-section taken along the line A-A of FIG. 1.

According to an exemplary embodiment of the disclosure, FIG. 2 shows a cross-section taken along the line A-A of FIG. 1. As shown in FIG. 2, the double layer structure of the side wall 20 is formed by a pair of blind holes 22, which extend in opposite height directions of the side wall 20. The blinding holes 22 extend from two opposite sides of the side wall 20 along a common axis, but do not communicate with each other. Preferably, pairs of blind holes 22 are provided in the side wall 20, which in each pair extend in opposite direction along a common axis.

Furthermore, it should be noted that the hole 21 in the side wall 20 which provides the side wall 20 with the double layer structure can have any appropriate shape, such as circular shape, kidney shape or other irregular shape. Moreover, the blind holes 22 in pairs can be staggered and thus do not extend along a common axis.

Figure 3:
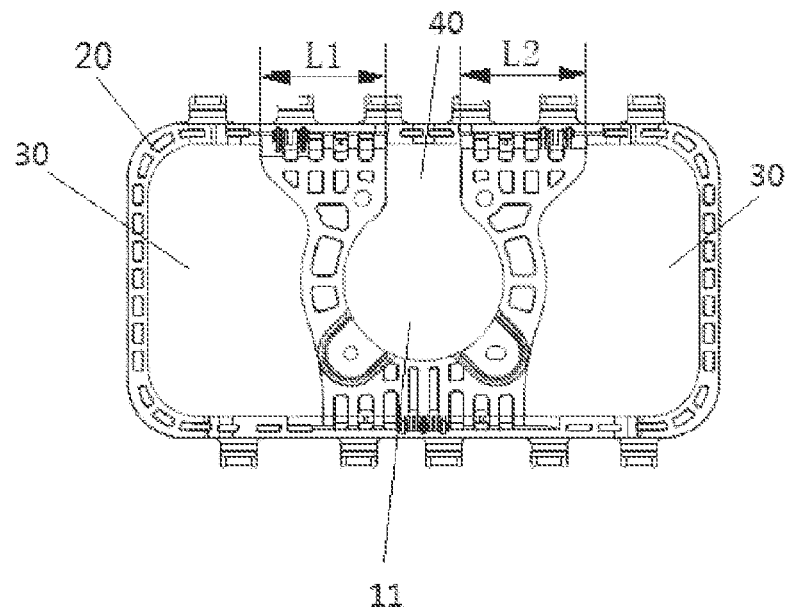
FIG. 3 is a top view of an airbag housing according to an embodiment of the present disclosure.

The airbag housing 100 according to the present disclosure can be partially cut through to form an opening in order to reduce its weight. According to an embodiment, FIG. 3 shows a top view of an airbag housing according to an embodiment of the present disclosure. As shown in FIG. 3, the opening can comprise a first opening 30 formed in the airbag housing 100, which extends from the bottom wall 10 to the side wall 20. Particularly, as shown in FIG. 3, the orifice 11 for aligning with the gas inlet of the airbag cushion is formed in the bottom wall 10. The airbag cushion is crimped into the cavity of the airbag housing 100 at an outside area of the orifice 11 by a clamp ring, and is fixed through the fixing holes 12. The bottom wall 10 has a joining area at which the airbag cushion is crimped with the bottom wall 10. The first opening 30 extends from a periphery of the joining area to the side wall 20 along a longitudinal direction of the airbag housing 100 (y direction in FIG. 1). Therefore, two openings 30 are formed symmetrical with respect to a lateral center axis of the bottom wall 10.

According to an embodiment, as shown in FIG. 3, the opening can also comprise a second opening 40 formed in the airbag housing 100, which extends from the orifice 11 to the side wall 20 along a lateral direction of the bottom wall 10 (x direction in FIG. 1) and communicates with the orifice 11.

According to an exemplary embodiment of the disclosure, the opening comprises the two first openings 30 and the second opening 40, which can save more material in the airbag housing 100 and reduce more weight.

FIG. 3 shows specific positions and shapes of the openings. However, it should be noted that the opening is not limited to the above positions and shapes. A person skilled in the art can appropriately select the position, shape and size of the opening according to the magnitude of forces applied on various components of the airbag housing 100 during the explosion of the airbag.

When the airbag housing 100 is passed through by the two first openings 30 and the second opening 40, the bottom wall 10 has less remaining materials. For the connection between the bottom wall 10 and gas generator, airbag cushion or other components of the airbag assembly, it is preferred that the airbag housing 100 further comprises a reinforcement that extends from the bottom wall 10 to the side wall 20.

According to an exemplary embodiment of the disclosure, as shown in FIG. 1, the reinforcement comprises a rib 50 formed on the bottom wall 10 and the side wall 20. The rib 50 extends from a surface of the bottom wall 10 to a surface of the side wall 20 to enforce connection strength of the bottom wall 10 and the side wall 20. For plastic housing, the rib 50 can be integrally formed with the bottom wall 10 and the side wall 20 by injection molding. Preferably, there are ribs 50 formed on respective outer surfaces and respective inner surfaces of the bottom wall 10 and the side wall 20, and these ribs 50 are parallelly arranged in the longitudinal direction of the airbag housing 100 to ensure uniform strength distribution. The rib 50 can be U-shape rib, I-shape rib, C-shape rib and the like. Each of the ribs 50 can have identical height and thickness.

Furthermore, the reinforcement can also comprise a reinforced support and the like provided between the bottom wall 10 and the side wall 20.

Furthermore, the connection strength of the bottom wall 10 can be reinforced by enlarging the connection area between the bottom wall 10 and the side wall 20. Particularly, as shown in FIG. 3, the bottom wall 10 is divided into two parts at a side where the second opening 40 is formed, and these two parts have lengths L1 and L2 for connecting with the side wall 20. During the explosion of the airbag, the side of the bottom wall 10 at which the second opening 40 is formed bears a large load. To increase the strength of the bottom wall 10 at the second opening side, it is preferred that a connecting length of the bottom wall 10 and the side wall 20 at a second-opening side is larger than a connecting length of the bottom wall 10 and the side wall 20 at a side opposite to the second-opening side.

Figure 4:
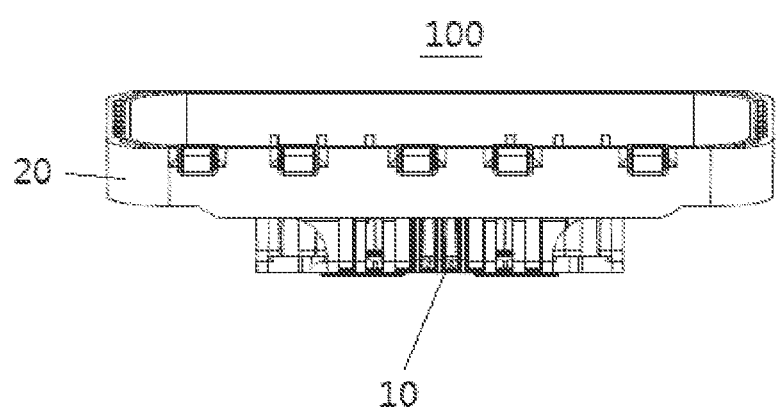
FIG. 4 is a front view of an airbag housing according to an embodiment of the present disclosure.
Figure 5:
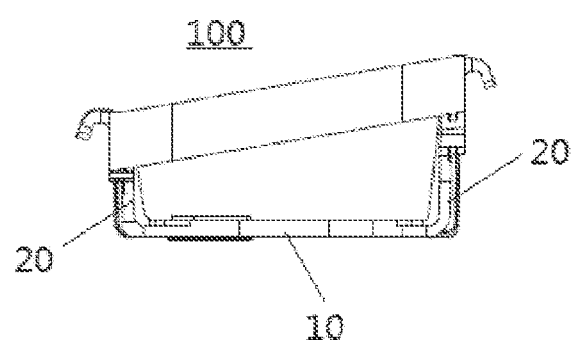
FIG. 5 is a left view of an airbag housing according to an embodiment of the present disclosure.

Furthermore, a height of the side wall 20 at a second-opening side can be smaller than a height of the side wall 20 at a side opposite to the second-opening side, as shown in FIG. 4 and FIG. 5. FIG. 4 is a front view of an airbag housing according to an embodiment of the present disclosure. FIG. 5 is a left view of an airbag housing according to an embodiment of the present disclosure. The side wall 20 has a height difference between the height at the second-opening side and the height at the side opposite to the second-opening side. Therefore, the height of the side wall 20 at the second-opening side can be adjusted to mitigate risk of deformation or fracture of the airbag housing 100 at this side.

The airbag housing 100 according to the disclosure can also reduce its weight in other ways. As shown in FIG. 1, lightening holes 60 are provided between two adjacent ribs 50. The lightening holes 60 are arranged on two opposite sections of the side wall 20 on which the ribs 50 are formed, and extend in the longitudinal direction of the airbag housing 100. Moreover, lightening slots 70 are formed in the bottom wall 10 and distributed across the inner surface and outer surface of the bottom wall 10 in order to reduce the thickness of the bottom wall 10 and save materials of the housing.

There is provided a airbag assembly according to the disclosure, comprising: a gas generator; an airbag cushion; a clamp ring; an airbag housing 100 comprising: a bottom wall 10 and a side wall 20 for forming a cavity accommodating an airbag cushion, wherein the side wall 20 is formed in a double layer structure, wherein the airbag cushion is crimped into the cavity of the airbag housing 100 by the clamp ring, and wherein a gas inlet of the airbag cushion aligns with an orifice 11 in the bottom wall 10, the gas generator is outside of the cavity, and the airbag cushion, the clamp ring, the airbag housing 100 and the gas generator are fixed together such that the gas generator is able to fill the airbag cushion with gas.

Though the present invention has been described above with reference to exemplary embodiments, it should be noted that the present invention is not limited to the configurations and methods of the above exemplary embodiments. Contrarily, the present invention is intended to cover various modifications and equivalents. Furthermore, though various exemplary combinations and structures disclose various elements and method steps of the disclosure, other combinations including more or less elements or steps also fall into the scope of the present disclosure.

What is claimed is:

1. An airbag housing comprising:
   a bottom wall; and
   a side wall for forming a cavity configured to accommodate an airbag cushion together with the bottom wall, at least a portion of the side wall formed in a double layer structure;
   a first opening extending from the bottom wall to the side wall that is connected with the bottom wall;
   a second opening in the housing extending from the orifice to the side wall; and
   an orifice formed in the bottom wall, the orifice including an outside portion configured for attachment of the airbag cushion, the bottom wall including a joining area,
   wherein the first opening extends from a periphery of the joining area to the side wall.

2. The airbag housing according to claim 1, further comprising a reinforcement extending from the bottom wall to the side wall.

3. The airbag housing according to claim 1, wherein a first connecting length of the bottom wall and the side wall at a second-opening side of the bottom wall is larger than a second connecting length of the bottom wall and the side wall at a side of the bottom wall opposite to the second-opening side.

4. The airbag housing according to claim 1, wherein a first height of the side wall at a second-opening side is smaller than a second height of the side wall at a side of the side wall opposite to the second-opening side.

5. An airbag housing comprising:
   a bottom wall; and
   a side wall for forming a cavity configured to accommodate an airbag cushion together with the bottom wall;
   a first opening extending from the bottom wall to the side wall that is connected with the bottom wall;
   a second opening in the housing extending from the orifice to the side wall; and
   an orifice formed in the bottom, the orifice including an outside portion configured for attachment of the airbag cushion, the bottom wall including a joining,
   wherein the first opening extends from a periphery of the joining area to the side wall.

6. An airbag housing comprising:
   a bottom wall; and
   a side wall, the side wall and the bottom wall cooperating to form a cavity;
   an orifice formed in the bottom wall; and
   first and second openings symmetrically formed relative to a lateral central axis of the bottom wall, the first and second openings both extending completely between longitudinally opposite sides of the side wall in a first direction parallel to the lateral central axis, and extending in a second direction perpendicular to the lateral central axis between the bottom wall and a respective laterally opposite side of the side wall;
   a cavity configured to accommodate an airbag cushion,
   wherein the orifice is configured to align with a gas inlet of the airbag cushion.

7. The airbag housing according to claim 6, wherein the bottom wall is U-shape with a first leg, a second leg and a connection portion.

8. The airbag housing according to claim 7, wherein the connecting portion is adjacent one of the laterally opposite sides of the side wall.

9. The airbag housing according to claim 8, wherein the first and second legs laterally extend from the connecting portion to the other of the laterally opposite sides of the side wall.

* * * * *